United States Patent
Min et al.

(10) Patent No.: US 9,075,756 B2
(45) Date of Patent: Jul. 7, 2015

(54) METHOD AND APPARATUS FOR ALLOWING ACCESS TO INDIVIDUAL MEMORY

(75) Inventors: Kyung-chul Min, Seoul (KR); Se-jin Kang, Seoul (KR)

(73) Assignee: MTEKVISION CO., LTD., Seoul (KR)

( * ) Notice: Subject to any disclaimer, the term of this patent is extended or adjusted under 35 U.S.C. 154(b) by 1533 days.

(21) Appl. No.: 11/910,927

(22) PCT Filed: Nov. 18, 2005

(86) PCT No.: PCT/KR2005/003912
§ 371 (c)(1),
(2), (4) Date: Oct. 8, 2007

(87) PCT Pub. No.: WO2006/115324
PCT Pub. Date: Nov. 2, 2006

(65) Prior Publication Data
US 2008/0316343 A1 Dec. 25, 2008

(30) Foreign Application Priority Data

Apr. 12, 2005 (KR) .................. 10-2005-0030234

(51) Int. Cl.
*H04N 5/76* (2006.01)
*G06F 13/36* (2006.01)
*G06F 12/14* (2006.01)

(52) U.S. Cl.
CPC ......... *G06F 12/1458* (2013.01); *Y02B 60/1225* (2013.01)

(58) Field of Classification Search
USPC ........... 348/211.6, 231.2, 231.3, 231.6, 231.9
See application file for complete search history.

(56) References Cited

U.S. PATENT DOCUMENTS

| | | | |
|---|---|---|---|
| 4,545,068 A | 10/1985 | Tabata et al. | |
| 5,748,921 A | 5/1998 | Lambrecht et al. | |
| 6,618,082 B1* | 9/2003 | Hayashi et al. | 348/231.99 |
| 6,738,870 B2 | 5/2004 | Van Huben et al. | |
| 6,801,719 B1* | 10/2004 | Szajewski et al. | 396/333 |
| 2004/0153597 A1* | 8/2004 | Kanai et al. | 710/305 |
| 2005/0094001 A1* | 5/2005 | Saga | 348/231.99 |

FOREIGN PATENT DOCUMENTS

JP 62079557 B 4/1987

* cited by examiner

*Primary Examiner* — Twyler Haskins
*Assistant Examiner* — Carramah J Quiett
(74) *Attorney, Agent, or Firm* — Birch, Stewart, Kolasch & Birch, LLP

(57) ABSTRACT

A method for detecting color temperature and an apparatus thereof are disclosed. According to the present invention, the apparatus for detecting color temperature converts RGB color information, generated by interpolating an image signal sequentially inputted in units of pixel from an image sensor, to a three-dimensional coordinate value of luminance, R-G color difference information, and B-G color difference information, and then renews the added value per color, if included in a filtering zone corresponding to a characteristic curve of the image sensor. Then, an average value per color is generated in units of frame, and the compensation rate per color is determined such that the average value per color becomes identical to each other. With the present invention, accurate colors can be displayed by detecting the color temperature of the current light source and correcting the distorted color information.

19 Claims, 13 Drawing Sheets

PRIOR ART

PRIOR ART

PRIOR ART

PRIOR ART

METHOD AND APPARATUS FOR ALLOWING ACCESS TO INDIVIDUAL MEMORY

CROSS REFERENCE TO RELATED APPLICATIONS

This application is a U.S. National Application of International Application PCT Application No. PCT/KR2005/003912 filed on Nov. 18, 2005, which claims the benefit of priority from Korean Patent Application No. 10-2005-0030234 filed on Apr. 12, 2005. The disclosures of International Application PCT Application No. PCT/KR2005/003912 and Korean Patent Application No. 10-2005-0030234 are incorporated herein by reference.

TECHNICAL FIELD

The present invention is directed to detecting color temperature, more specifically to detecting color temperature of an imaging device.

BACKGROUND ART

In general, the way an object is reflected depends on the light source. This is due to the color temperature that is different for each light source. For example, a white object appears reddish when placed under a light source of low color temperature. On the other hand, when the object is placed under a light source of high color temperature, the object appears bluish.

For this reason, most photographing apparatuses, such as a camera, compensate the difference of color, caused by different color temperatures, by use of a method called automatic white balance (AWB).

Below, the automatic white balance method in accordance with the prior art is briefly described.

First, the picture data generated through an image sensor in a photographing apparatus is transformed to color signals (R, G, B), and then R and B gains are adjusted. Then, the adjusted color signals are transformed to the color space of brightness (Y) and color difference signals (R-Y, B-Y), and the color difference signals of a screen are integrated and the average of the integration is calculated. This average is assumed to be the white value.

If the derived average value changes from the assumed white value due to the change of external light source, the changed R and B gains are calculated. By adjusting the R and B gains on the changed R and B gains, the white balance is adjusted.

FIGS. 1-3 illustrate conditions for detecting color temperature for applying the automatic white balance method of the prior art.

As shown in each of FIGS. 1-3, a color zone (the filtering zone for detecting valid color information only) is set such that a characteristic curve 110 is included on a UV plane. The characteristic curve 110 is a curve calculated by coordinates, in which color information (R, G, B) from reflecting a color on a virtual object of achromatic color (e.g. white, gray, and black) is present. The red component becomes intense near the upper end 115 of the characteristic curve, and the blue component becomes intense near the lower end 120. That is, the image data has a reflector, which is achromatic and thus makes the image data have the same color as the light source, and, by determining this color, the current color temperatures can be inferred. YUV is a way of expressing the color, breaking down to Y component, which is luminance, and U and V components, which are chrominance. If R, G, and B values are given, Y, U, and V can be obtained from the following Eqs. 1-3:

$$Y = 0.3R + 0.59G + 0.11B \quad \text{Eq. 1}$$

$$U = (B-Y) \times 0.493 \quad \text{Eq. 2}$$

$$V = (R-Y) \times 0.877 \quad \text{Eq. 3}$$

The color zone is an area on the UV plane that has high possibility of reflected light by the reflector. Any light outside the color zone can be considered to be not of reflected light by the reflector. Therefore, the most important factor for determining color temperature can be determining the area and shape of the color zone.

In the prior art, the color zone for the determination of color temperature has been determined to be a rectangle 130 containing all of the characteristic curve 110 (see FIG. 1), two rectangles 210 and 220 (i.e. one rectangle 210 containing the upper characteristic curve and the other rectangle 220 containing the lower characteristic curve, about the origin), or a parallelogram 310 containing all of the characteristic curve 110. Then, the color temperature in a frame has been determined and corrected, using color information corresponding to the pertinent color zone.

However, when the color zone is formed by one rectangle 130, as shown in FIG. 4, color information 410 and 420 that is unrelated to the characteristic curve is included, causing errors in detecting color temperature. Although a plurality of rectangles 210 and 220 or a parallelogram 310 can be used to form the color zone, in order to overcome this problem, discontinuity of color zones or unnecessary color information cannot still be avoided.

Moreover, considering that the characteristic curve of the image sensor of a photographing apparatus is a little more distorted than normal characteristics, the various conventional methods for determining the color zone still have a problem of containing more erroneous color information (i.e. color information, included by unnecessarily expanding the color zone, which increases error rates while detecting color temperatures). This increases the error rates when detecting color temperatures and increases the amount of computation, making the color temperature detecting apparatus more complicated.

The conventional method of detecting color temperature interpolates the RGB Bayer type image to derive a RGB value, which is then converted to a YUV value, and the color information using this YUV value to match on the UV plane is used. However, detecting color temperature using the YUV value had problems of the structure being too complicated and the calculation increasing, due to the calculations of decimal numbers, negative numbers, and multiplication.

DISCLOSURE

Technical Problem

Therefore, in order to solve the above problems, it is an object of the present invention to provide a method and an apparatus for detecting color temperature that can render accurate colors by correcting distorted color information through detecting the color temperature of current light source.

It is another object of the present invention to provide a method and an apparatus for detecting color temperature that reduce error rates and minimize the amount of calculation by minimizing the area of the color zone (the filtering zone for detecting valid color information only), in which valid color information for detecting color temperature is distributed.

It is yet another object of the present invention to provide a method and an apparatus for detecting color temperature that can increase the accuracy of detecting color temperature by having the color zone determined to best fit the characteristic curve of the image sensor.

It is still another object of the present invention to provide a method and an apparatus for detecting color temperature that can increase process efficiency by eliminating the calculation of negative numbers or decimal numbers when detecting color temperature using valid color information.

Technical Solution

In order to achieve the above objects, an aspect of the present invention features a photographing apparatus performing color temperature detection.

According to a preferred embodiment of the present invention, the photographing apparatus performing color temperature detection comprises: an interpolation processing unit, generating pixel information using an image signal inputted in units of pixel from an image sensor in accordance with a first subject, wherein the pixel information comprises R color information, G color information, and B color information; a conversion unit, calculating a three-dimensional coordinate value using the pixel information, the three-dimensional coordinate value consisting of luminance, R-G color difference information, and B-G color difference information; a zone generating unit, generating and managing filtering zone set to include a characteristic curve of the image sensor; and a color temperature detecting unit (or a color temperature determining unit), renewing an added value, calculating an average value per color in units of frame, and determining a compensation rate per color such that an average value per color becomes the same, in case a three-dimensional coordinate of the pixel is included in the filtering zone.

The above photographing apparatus can further comprise a mapping unit, adding a predetermined value to the R-G color difference information, the B-G color difference information, and a coordinate value of the filtering zone, such that the R-G color difference information and the B-G color difference information have a value that is not a negative number. Here, the predetermined value, such that the R-G color difference information and the B-G color difference information have a value that is not a negative number, can be an (a, b) coordinate value for an R-G color difference information axis and B-G color difference information axis. The value of a and the value of b are positive values that can be either identical to or different from each other.

If the interpolation processing unit generates pixel information using an image signal inputted in units of pixel from the image sensor in accordance with a second subject, the photographing apparatus can further comprise a compensation performing unit, outputting by applying the compensation rate per color to the pixel information.

The compensation rate per color can be a rate that makes an R color average value and a B color average value identical to a G color average value.

The filtering zone can be a polygon having 4 to 8 sides. Moreover the filtering zone can be generated in a shape of "└" or "┘".

The zone generating unit can generate the filtering zone on a plane consisting of an R-G color difference information axis and a B-G color difference information axis, using 2 straight lines, each of which moving upward and downward from either of 2 reference points, each of which being on the left side and the right side, respectively, of the characteristic curve on the R-G color difference information axis and the B-G color difference information axis. Here, the straight line can have a slope value between a slope value of a straight line connecting each reference point and an end point of the characteristic curve and a slope value of a straight line connecting the end point and a point with the maximum curvature on the characteristic curve.

The filtering zone can be generated by further comprising at least one of a horizontal limit line and vertical limit line corresponding to an upper end point and a lower end point, respectively, of the characteristic curve.

To achieve the above objects, another aspect of the present invention features a recorded medium recording a program for detecting color temperature in a photographing apparatus.

According to a preferred embodiment of the present invention, the recorded medium tangibly embodies a program of instructions executable by a digital processing apparatus to execute a method for detecting color temperature. The program is readable by the digital processing apparatus. The program executes the steps of: generating a filtering zone, set in a shape of "└" or "┘", such that a characteristic curve of an image sensor is included; (a) receiving an image signal in units of pixel from the image sensor in accordance with a first subject; (b) generating pixel information using the inputted image signal, wherein the pixel information consists of R color information, G color information, and B color information; (c) calculating a three-dimensional coordinate value using the pixel information, the three-dimensional coordinate value consisting of luminance, R-G color difference information, and B-G color difference information; (d) renewing an added value per color, in case the three-dimensional coordinate of the pixel is included in the filtering zone; performing the steps (a)-(d) for all pixels included in the same frame; calculating an average value per color in units of frame; and determining a compensation rate per color, such that the average value is identical for every color.

A predetermined value can be added to the R-G color difference information, the B-G color difference information, and a coordinate value of the filtering zone, such that the R-G color difference information and the B-G color difference information have a value that is not a negative number.

The above program can further execute the steps of: receiving an image signal in units of pixel from the image sensor in accordance with a second subject; generating pixel information using the image signal; and outputting by applying the compensation rate per color to the pixel information.

The compensation rate per color can be a rate that makes an R color average value and a B color average value identical to a G color average value.

The filtering zone can be a polygon having 4 to 8 sides.

Moreover, the filtering zone can be generated on a plane consisting of an R-G color difference information axis and a B-G color difference information axis, using 2 straight lines, each of which moving upward and downward from either of 2 reference points, each of which being on the left side and the right side, respectively, of the characteristic curve on the R-G color difference information axis and the B-G color difference information axis. Here, the straight line can have a slope value between a slope value of a straight line connecting each reference point and an end point of the characteristic curve and a slope value of a straight line connecting the end point and a point with the maximum curvature on the characteristic curve.

The filtering zone can be generated by further comprising at least one of a horizontal limit line and vertical limit line corresponding to an upper end point and a lower end point, respectively, of the characteristic curve.

MODE FOR INVENTION

As used in this application, the term "unit" is intended to refer to a self-contained component of a system, either hardware, a combination of hardware and software, software, or software in execution. For example, a unit can be, but is not limited to being, a process running on a processor, a processor, an electronic circuit executing a process, multiple storage drives (of optical and/or magnetic storage medium), an object, an executable, a thread of execution, a program, and/or a computer. One or more units can reside within an electronic circuit, a process and/or thread of execution.

The present invention, operative advantages of the present invention, and objects achieved by embodying the present invention shall be apparent with reference to the accompanying drawings and the description therein.

Hereinafter, preferred embodiments of the present invention shall be described in detail with reference to the accompanying drawings. To aid overall understanding of the present invention, the same reference numbers shall be assigned to the same means, regardless of the figure number. Moreover, the numbers (e.g., first, second, A, B, etc.) are only used in the description to identify identical or similar elements.

Furthermore, the method and apparatus for detecting color temperature in accordance with the present invention should be able to be applied, without any restriction, to every photographing apparatus with a camera function, such as a portable terminal and a digital camera, which receives and displays an external image.

Figure 1:
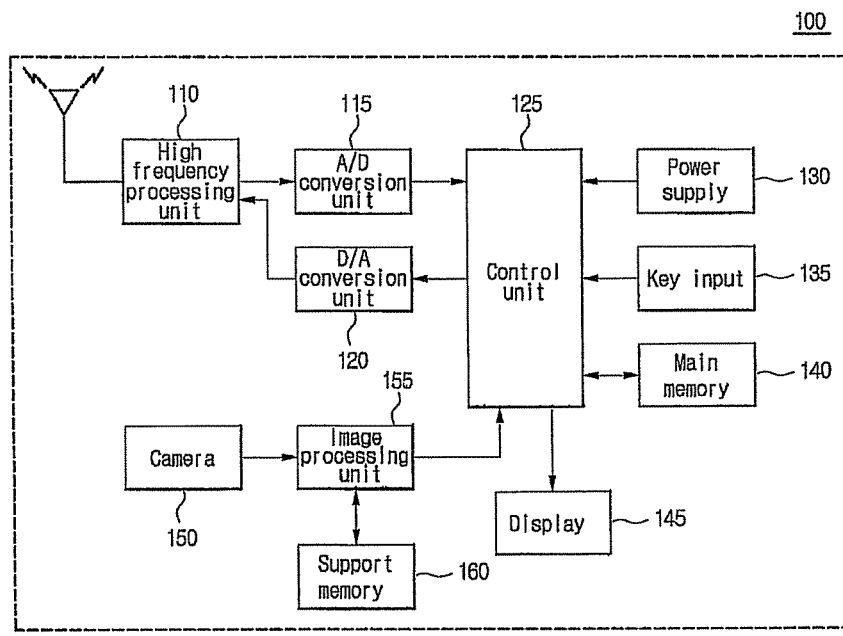
FIGS. 1-4 show how the color zone is determined in accordance with the prior art.
Figure 2:
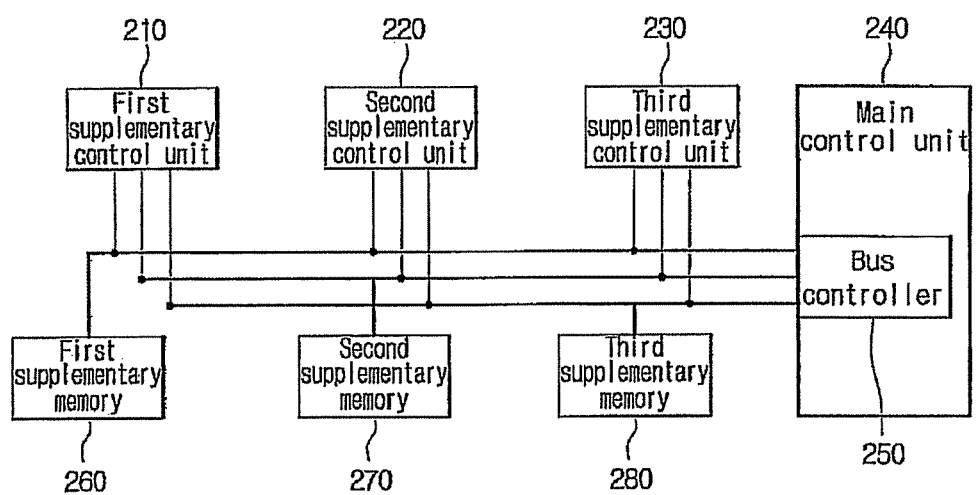
Figure 3:
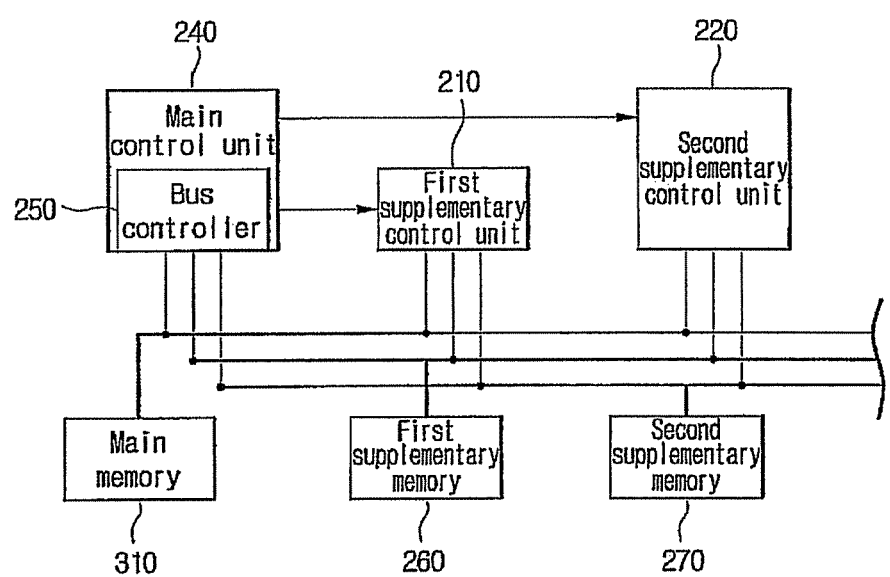
Figure 4:
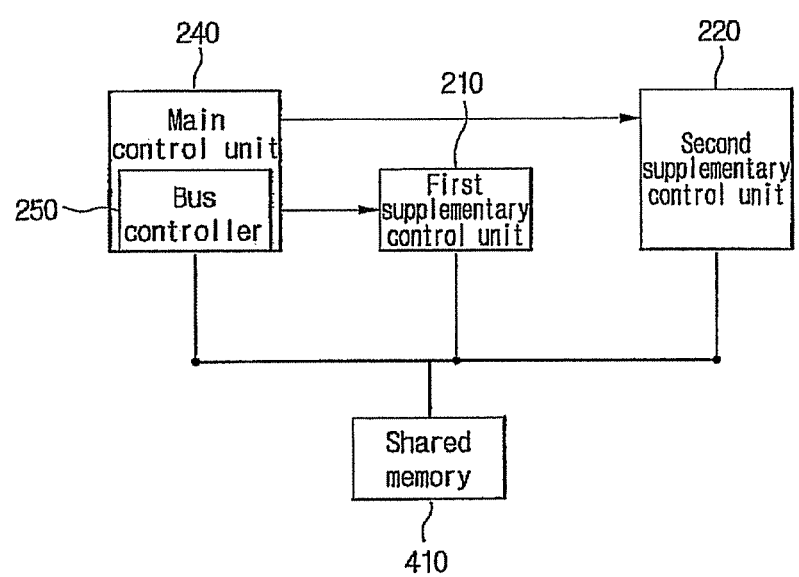
Figure 5:
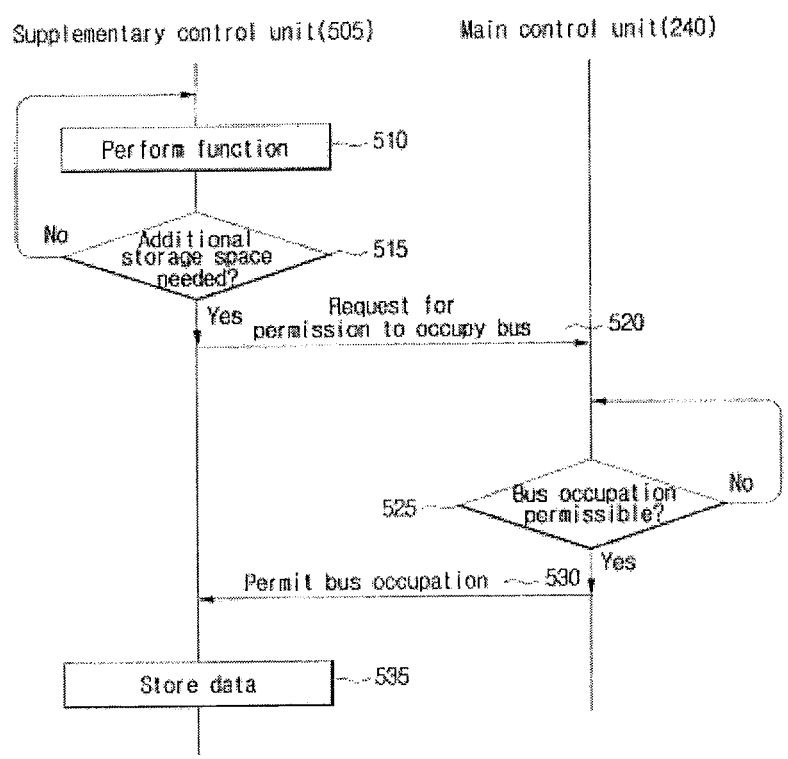
FIG. 5 shows a block diagram of an apparatus for detecting and compensating color temperature in accordance with a preferred embodiment of the present invention.
Figure 6:
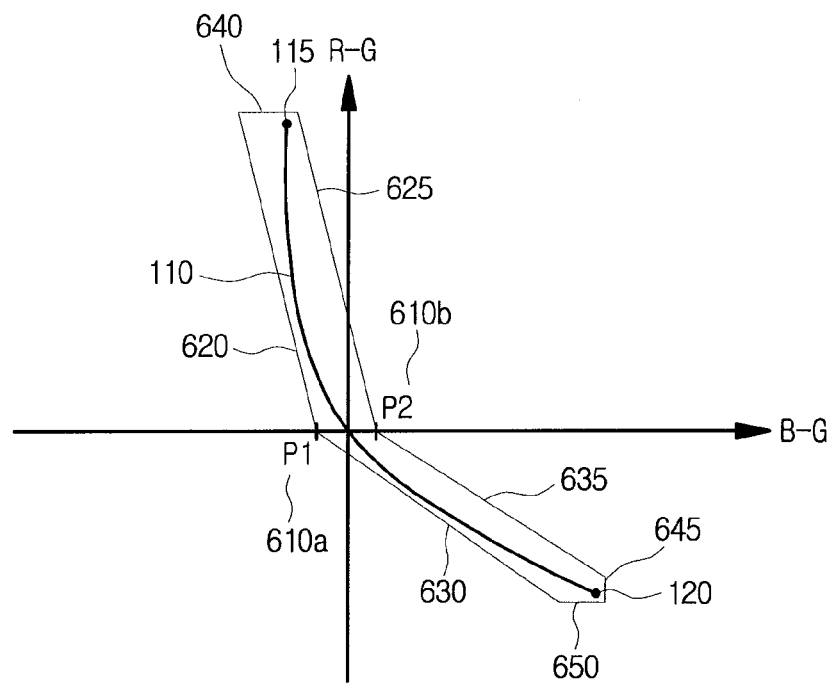
FIG. 6 shows how the color zone is determined in accordance with a preferred embodiment of the present invention.
Figure 11:
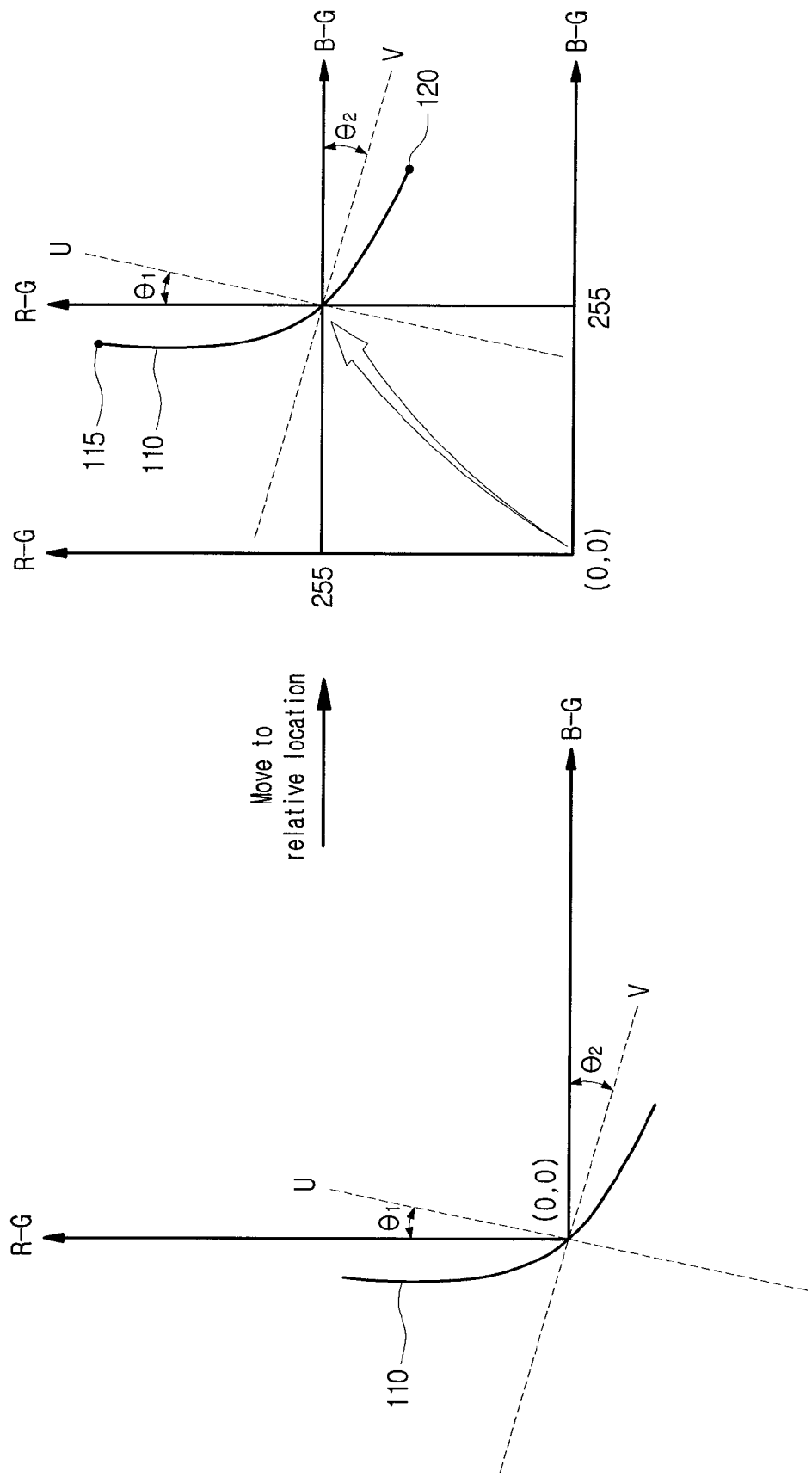
FIG. 11 shows moving the color zone to a relative position in accordance with a preferred embodiment of the present invention.
Figure 12:
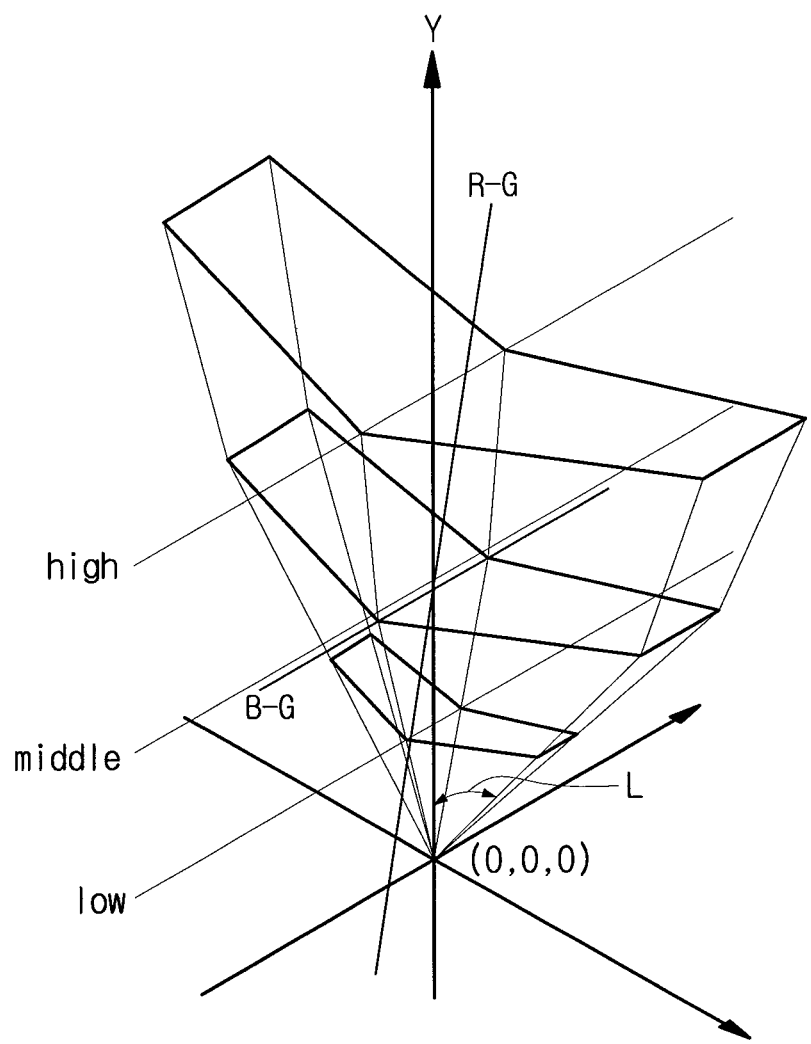
FIG. 12 shows the change in area of the color zone in a three-dimensional space in accordance with a preferred embodiment of the present invention.
Figure 13:
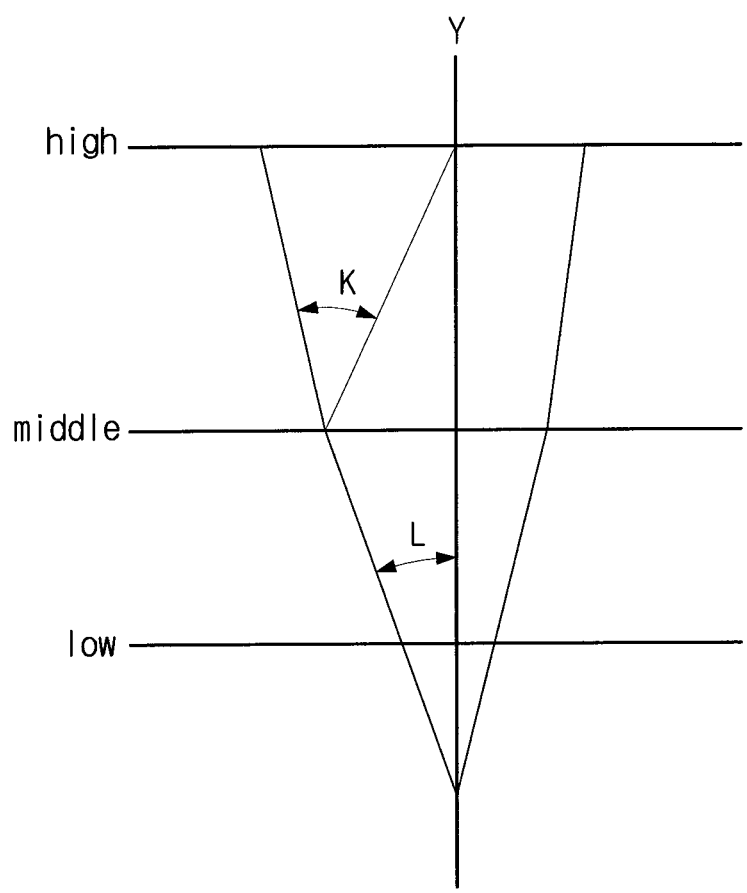
FIG. 13 shows the range of increase/decrease in area of the color zone, according to the increase/decrease in luminance value, in accordance with a preferred embodiment of the present invention.

FIG. 5 is a block diagram showing an apparatus for detecting and compensating color temperature in accordance with a preferred embodiment of the present invention; FIG. 6 shows how the color zone is determined in accordance with a preferred embodiment of the present invention; FIGS. 7-10 illustrate a method for determining each boundary of the color zone in accordance with a preferred embodiment of the present invention; FIG. 11 shows moving the color zone to a relative position in accordance with a preferred embodiment of the present invention; FIG. 12 shows the change in area of the color zone in a three-dimensional space in accordance with a preferred embodiment of the present invention; and FIG. 13 shows the range of increase/decrease in area of the color zone, according to the increase/decrease in luminance value, in accordance with a preferred embodiment of the present invention.

Referring to FIG. 5, the apparatus for detecting and compensating color temperature in accordance with the present invention comprises an image sensor 510, an image processing unit 515, and a display unit 520.

The image sensor 510 can include a color filter array (CFA) and an A/D converter. The image sensor 510 can also further include a lens.

The color filter array converts an optical subject signal, inputted through a lens, to an electrical signal. Here, the color filter array can use a Bayer pattern, which provides better resolution, and as a result outputs an image signal having information of one color per pixel. That is, from a pixel corresponding to an R pattern, an image signal having R information only is outputted; from a pixel corresponding to a G pattern, an image signal having G information only is outputted; and from a pixel corresponding to a B pattern, an image signal having B information only is outputted. The color information of each pixel obtained through the color filter array of Bayer pattern can be interpolated (e.g. derive missing color information by averaging the values of the left and right pixels or averaging the 4 pixels of the top, bottom, left and right pixels) to be outputted as complete color information. The interpolation is carried out by an interpolation processing unit 530.

The A/D converter converts the image signal, converted by the color filter array, to a digital signal and delivers the digital signal to the image processing unit 515.

The image processing unit 515 comprises an interpolation processing unit 530, a conversion unit 535, a color zone generating unit 537, a mapping unit 540, and a color temperature detecting unit 545. The image processing unit 515 can further comprise a correction processing unit, which analyzes luminance of each image signal and gain and level of each RGB and detects the central pixel of a shading image, a correction register table, which is generated by the luminance component in accordance with one of the RGB color information, an interpolation memory, in which color information of neighboring pixels is temporarily stored for interpolation, a color adjusting unit, which adjusts color (e.g. greenish blue), a gamma conversion unit, which adjusts an image to the device characteristic (gamma characteristic) in order to display on the display unit 520, and a format conversion unit, which makes conversion to a picture signal format appropriate for the display unit 520. The imaging processing unit can further comprise a timing generating unit, which generates various timing signals from the horizontal sync signal (Hsync), vertical sync signal (Vsync), and pixel clock (PCLK), used in operation of the color filter array. The imaging processing unit can also further comprise a control unit, in order to control the operation of above components. Since the present invention is essentially for detecting and compensating color temperature, however, detailed description on the above components will not be provided herein.

The interpolation processing unit 530 generates RGB color information for each pixel. In case the image signal outputted from the color filter array has a Bayer arrangement, green or blue pixel signals can not be obtained in the pixel corresponding to red color. Thus, the interpolation processing unit 530 allows the red color pixel to generate the green or blue pixel signal by interpolating neighboring pixel signals.

The conversion unit 535 uses RGB color information corresponding to each pixel outputted from the interpolation processing unit 530 to calculate the R-G color difference information, B-G color difference information, and Y value, which is luminance information. The Y value can be easily calculated through the above Eq. 1 or any other known equation, and the color difference information can be easily obtained using the RGB color information of each pixel. Here, the conversion unit 535 can add a predetermined value (e.g. 255) in order to make the calculation easier by inhibiting the generation of a negative number while calculating the color difference information of each pixel. Of course, in order to prohibit the generation of a negative number, the mapping unit can use the characteristic curve 110, the color zone, and the plane coordinates of each pixel (i.e. R-G color difference information, B-G color difference information) to move the origin (i.e. the point with the maximum curvature of the characteristic curve 110) to a relative coordinates of (255, 255) when mapping such that the plane coordinates of each pixel are mapped on the first quadrant. Although using YUV data for detecting color temperature will enable more accurate calculation, it also requires heavier hardware use of a multiplier during the conversion, increasing the design size, amount of calculation, and time for calculation. Therefore, the present invention uses the Y value and R-G color difference and B-G color difference values for detecting and compensating color temperature. Although the present invention uses the Y value and R-G color difference and B-G color difference values, the values on the (R-G) (B-G) plane can be easily converted to values on the UV plane by using θ1 and θ2, which are the difference angle between the U axis and the R-G axis and the difference angle between the V axis and the B-G axis, respectively.

The color zone generating unit 537 comprehensively uses B-G color difference information, sequentially calculated through the conversion unit 535, and generates the optimal form of color zone on the characteristic curve 110 corresponding to the image sensor 510. The color zone can be determined by using the color information when the user photographs an achromatic subject (e.g. white paper) for color correction under a light source (e.g. incandescent light). Of course, if an object (e.g. achromatic paper) is photographed while the user has switched to the color zone determination mode through the user interface screen, displayed through the display unit 520, the color zone can be re-determined. Otherwise, the previously set color zone can be maintained. By providing the color zone boundary information to the mapping unit 540, the color zone generating unit 537 has color information on a subject mapped on a three-dimensional space having the Y value, R-G color difference information and B-G color difference information as its axes.

In FIG. 6, a form of color zone, determined by the zone generating unit 537, is illustrated. The color zone functions as a filtering zone, becoming a basis for classifying color information corresponding to each pixel into valid color information and invalid color information. The color zone is determined to correspond to the characteristic curve 110 of the image sensor 510. In general, the characteristic curve 110 of an image sensor is determined during the designing and manufacturing of the image sensor.

The color zone is determined by the color zone generating unit 537 as follows:

First, the color zone generating unit 537 comprehensively uses B-G color difference information, provided from the conversion unit 535 for the determination of color zone, and determines a first reference point (P1) 610*a* and a second reference point (P2) 610*b*, which are present on the B-G axis. In case the user has photographed an achromatic subject, for example, white paper, with a photographing apparatus, the first and second reference points 610*a* and 610*b* can be determined to be coordinates (e.g. the first reference point=(−3, 0) and the second reference point=(3, 0)) located along the B-G axis, separated about the origin by half the length (e.g. 255−249=6) of the range (e.g. 249~255), in which the B-G color difference information (i.e. the difference between the B color information expressed as any one of the values between 0 and 255 and the G color information expressed as any one of the values between 0 and 255) is distributed. Of course, it is evident that the first and second reference points 610*a* and 610*b* can be set manually by the user on the display unit 520, using the displayed user interface.

Then, from the first reference point 610*a*, a first line 620, directing upward with a slope, and a second line 630, directing downward with a slope, are determined, and then from the second reference point 610*b*, a third line 625, directing upward with a slope, and a fourth line 635, directing downward with a slope, are determined. Next, an upper limit line 640, defining the upper limit of the first line 620 and the third line 625, and a lower limit line 650, defining the lower limit of the second line 630 and the fourth line 635, are determined. Here, the upper limit line 640 and the lower limit line 650 can be determined to be located parallel around the end points of the characteristic curve 110 (e.g. the parallel line that passes or includes the end point). In case the first line 620 and/or the second line 630 extends beyond ±255, which is the end points of the B-G axis and R-G axis, the color zone generating unit 537 can make the first and second lines 620 and 630 either restricted at ±255 or drawn vertically around the end point (e.g. a left limit line and/or a right limit line 645 that is drawn vertically to pass or include the end point). This is because the RGB color information is expressed as a value between 0 and 255 and thus the color difference information will also be expressed as a value between 0 and 255.

Therefore, the color zone in accordance with the present invention can be a polygon having at least 4 boundary lines (i.e. the first line 620, the second line 630, the third line 625, and the fourth line 635) or a polygon having at least 8 boundary lines (i.e. first line 620, the second line 630, the third line 625, the fourth line 635, the upper limit line 640, the lower limit line 655, the left limit line, and the right limit line 645). FIG. 6 shows a color zone defined by 7 boundary lines (i.e. first line 620, the second line 630, the third line 625, the fourth line 635, the upper limit line 640, the lower limit line 655, and the right limit line 645).

Below, FIGS. 7-10 will be referenced to describe how the first through fourth lines are determined to define the boundaries of a color zone. Since it has been described above that the upper limit line 640, the lower limit line 650, left limit line, and the right limit line 645 are restricted to the end point of each axis and are determined to locate around the end point of the characteristic curve 110, no further description will be provided here.

Figure 7:
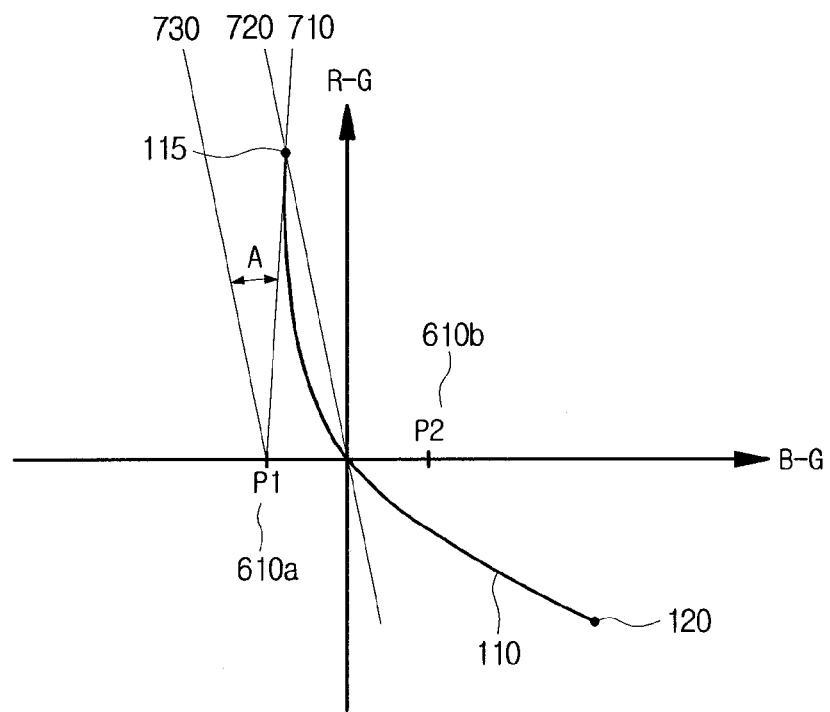
FIGS. 7-10 illustrate a method for determining each boundary of the color zone in accordance with a preferred embodiment of the present invention.

FIG. 7 shows how the slope of the first line 620 is determined with respect to the first reference point 610*a*. As shown in FIG. 7, the slope of the first line 620 can be a value within A, which is the range between A1, which is the slope of a line 710 connecting the first reference point 610*a* and the upper end of the characteristic curve 110, and A2, which is the slope of a line 730 parallel to a line 720 connecting the upper end of the characteristic curve 110 and the origin (i.e. the maximum curvature of the characteristic curve 110). However, if the line 710 connecting the first reference point 610a and the upper end of the characteristic curve 110 crosses the characteristic curve two or more times, A1 will be restricted to a slope crossing the characteristic curve 110 once.

Figure 8:
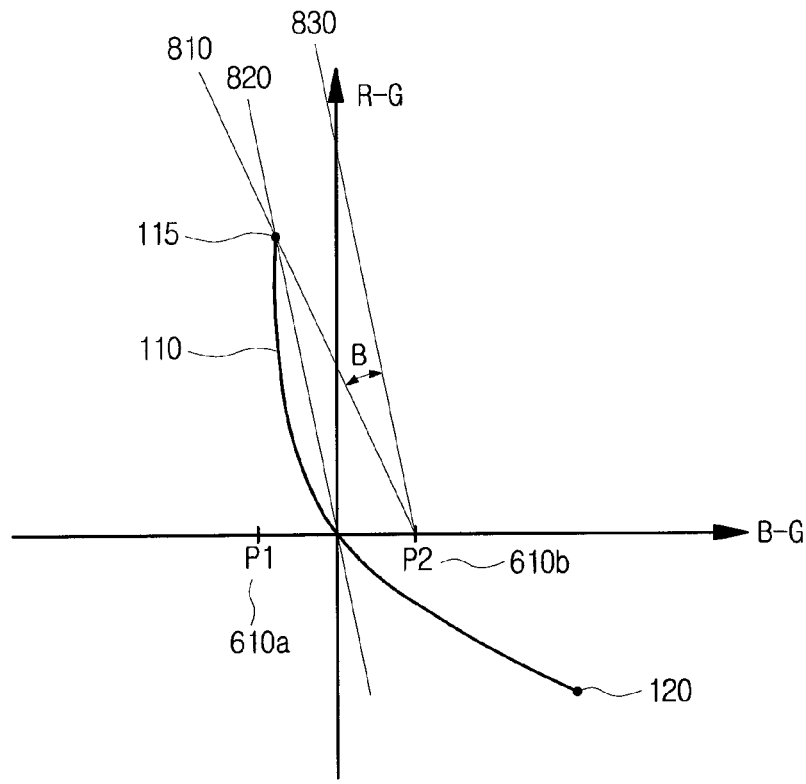

FIG. 8 shows how the slope of the third line 625 is determined with respect to the second reference point 610b. As shown in FIG. 8, the slope of the third line 625 can be a value within B, which is the range between B1, which is the slope of a line 810 connecting the second reference point 610b and the upper end of the characteristic curve 110, and B2, which is the slope of a line 730 parallel to the line 720 connecting the upper end of the characteristic curve 110 and the origin (i.e. the maximum curvature of the characteristic curve 110). However, if the line 810 connecting the second reference point 610b and the upper end of the characteristic curve 110 crosses the characteristic curve two or more times, B1 will be restricted to a slope crossing the characteristic curve 110 once.

Figure 9:
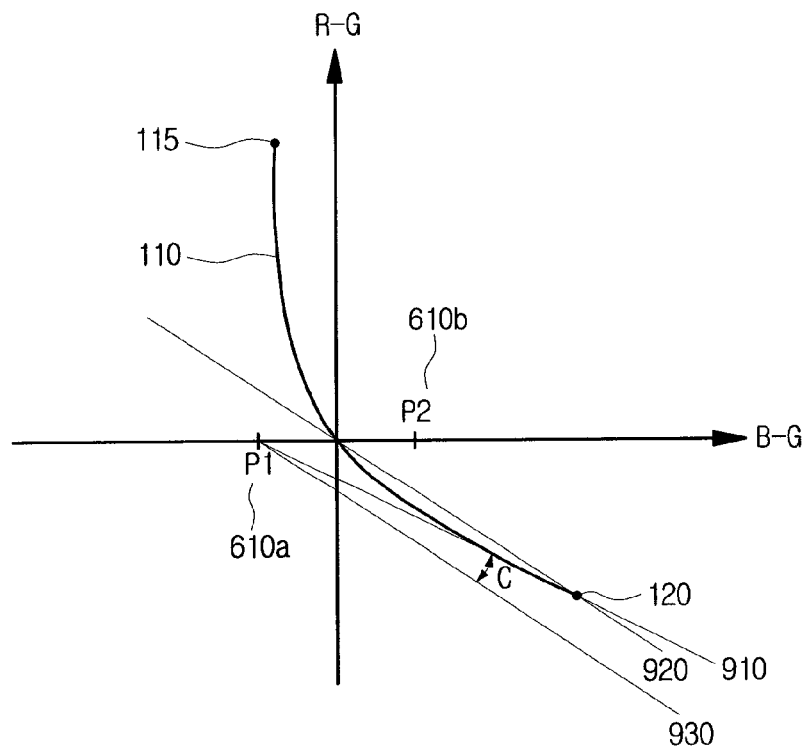

FIG. 9 shows how the slope of the second line 630 is determined with respect to the first reference point 610a. As shown in FIG. 9, the slope of the second line 630 can be a value within C, which is the range between C1, which is the slope of a line 910 connecting the first reference point 610a and the lower end of the characteristic curve 110, and C2, which is the slope of a line 930 parallel to a line 920 connecting the lower end of the characteristic curve 110 and the origin (i.e. the maximum curvature of the characteristic curve 110). However, if the line 910 connecting the first reference point 610a and the lower end of the characteristic curve 110 crosses the characteristic curve two or more times, C1 will be restricted to a slope crossing the characteristic curve 110 once.

Figure 10:
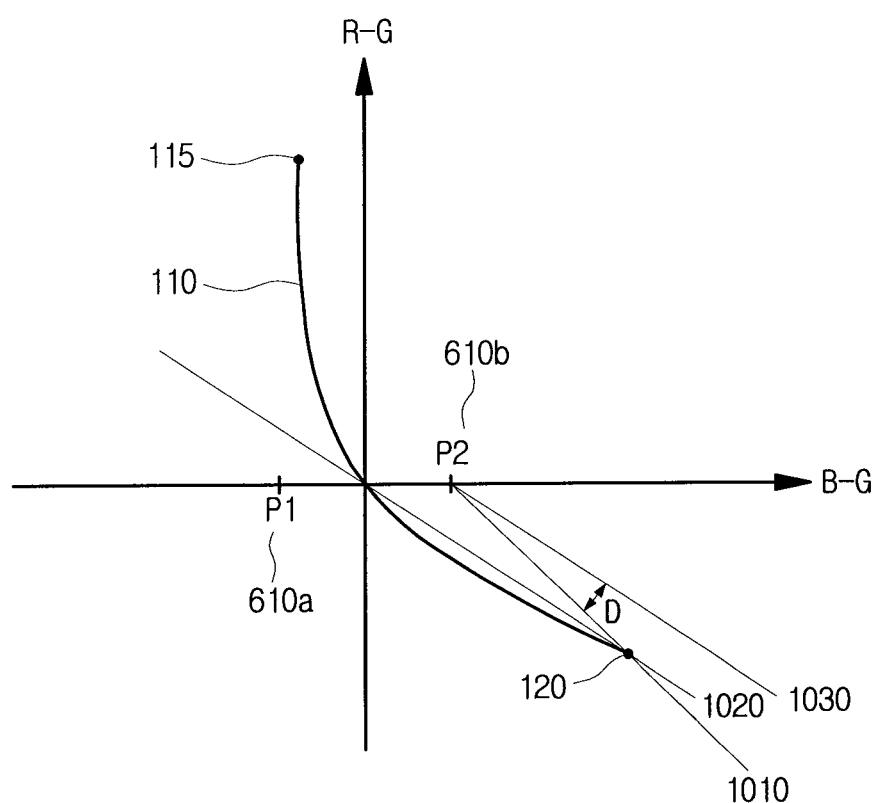

FIG. 10 shows how the slope of the fourth line 635 is determined with respect to the second reference point 610b. As shown in FIG. 10, the slope of the fourth line 635 can be a value within D, which is the range between D1, which is the slope of a line 1010 connecting the second reference point 610b and the lower end of the characteristic curve 110, and D2, which is the slope of a line 1030 parallel to a line 1020 connecting the lower end of the characteristic curve 110 and the origin (i.e. the maximum curvature of the characteristic curve 110). However, if the line 1010 connecting the second reference point 610b and the lower end of the characteristic curve 110 crosses the characteristic curve two or more times, D1 will be restricted to a slope crossing the characteristic curve 110 once.

As described above, the color zone generating unit 537 in accordance with the present invention can define a color zone to include the characteristic curve on the B-G R-G plane most naturally but with the least area.

Referring to FIG. 5 again, the mapping unit 540 sets color zone boundaries in a three-dimensional space having the Y value, R-G color difference information, and B-G color difference information as its axes, and distributes the values calculated by the conversion unit 535 in the three-dimensional space. As described above, the mapping unit 540 can map the plane coordinates of each pixel in the first quadrant by moving the origin (i.e. the maximum curvature of the characteristic curve 110) to a relative coordinate (255, 255). This is to increase the calculation efficiency by eliminating the calculation of negative numbers. The mapping unit 540 can be present as one of the components of the color temperature detecting unit 656, in which case the color temperature detecting unit 545 can easily determine whether the pertinent color information is valid color information or not, although the color temperature detecting unit 545 only uses area information of the color zone displayed in coordinate type and color information of each pixel.

As shown in FIG. 11, the mapping unit 540 can also have the color zone and color difference information move to a relative location by adding a relative coordinate value such that the color zone and color difference information can be located in the first quadrant (i.e. to skip the calculation of negative numbers). In this case, the mapping unit 540 can also add the same relative coordinate value to the color difference information, calculated by the conversion unit 535, and move and distribute the color difference information. At this time, a value between the minimum relative coordinate value (a, b) and the maximum relative coordinate value (255, 255) that allows all of the color information included in the color zone to have positive values can be applied as a relative coordinate value. Here, a and b can be different values.

Moreover, as shown in FIG. 12, the (B-G) (R-G) plane is expanded to a three-dimensional space by Y-axis. In this case, the area of the color zone on the (B-G) (R-G) plane, corresponding to a Y value, can increase or decrease in accordance with the Y value. That is, when the mid level is set as a case of the Y value being an auto exposure target value (AETV), the area of the color zone can proportionally decrease as the Y value gets smaller, and proportionally decrease, maintain, or proportionally increase as the Y value gets bigger (refer to FIG. 13). This is because there is no need to keep increasing the area of the color zone as the Y value increases, because the color becomes closer to the original color and less light gets reflected as the Y value becomes bigger. Moreover, for the same reason, the valid range of Y value can be limited to 20-80%.

Referring back to FIG. 5, the color temperature detecting unit 545 detects color temperature, using the average value of color difference information included in the color zone, and generates compensation rate information to compensate each pixel in accordance with the amount of distortion, using the detected color temperature. Also, the color temperature detecting unit 545 can output the inputted color information to the display unit 520 after compensating the color information using the compensation information. Of course, it is evident that the color temperature detecting unit 545 of FIG. 5 can only generate the compensation rate information (e.g. a gain value for calculation such that other color information become an identical value with respect to one of the R color information, G color information, and B color information) for compensating the distortion of RGB color information, distorted by the current light source, using a Bayer image corresponding to a photographed achromatic subject, and the compensation rate information for a subject photographed later can be applied in a component (e.g. a component included in the image processing unit 515, an image display processing unit disposed in the display unit 520, etc.) performing image processing for displaying an image, corresponding to the subject, on the display unit 520. By applying the compensation rate information, the photographed subject is displayed on the display unit 520 as if it is photographed under a natural light, regardless of the light source. Other features of the color temperature detecting unit 545 will be further described later with reference to FIG. 15.

The display unit 520 displays information compensated by the color temperature detecting unit 545, a subject image to which the compensation rate information is applied, etc. The display unit 520 can be, for example, an LCD screen. Of course, the coupling relationship between the processing unit 515 and the display unit 520 can vary, depending on the arrangement of the photographing apparatus.

Figure 14:
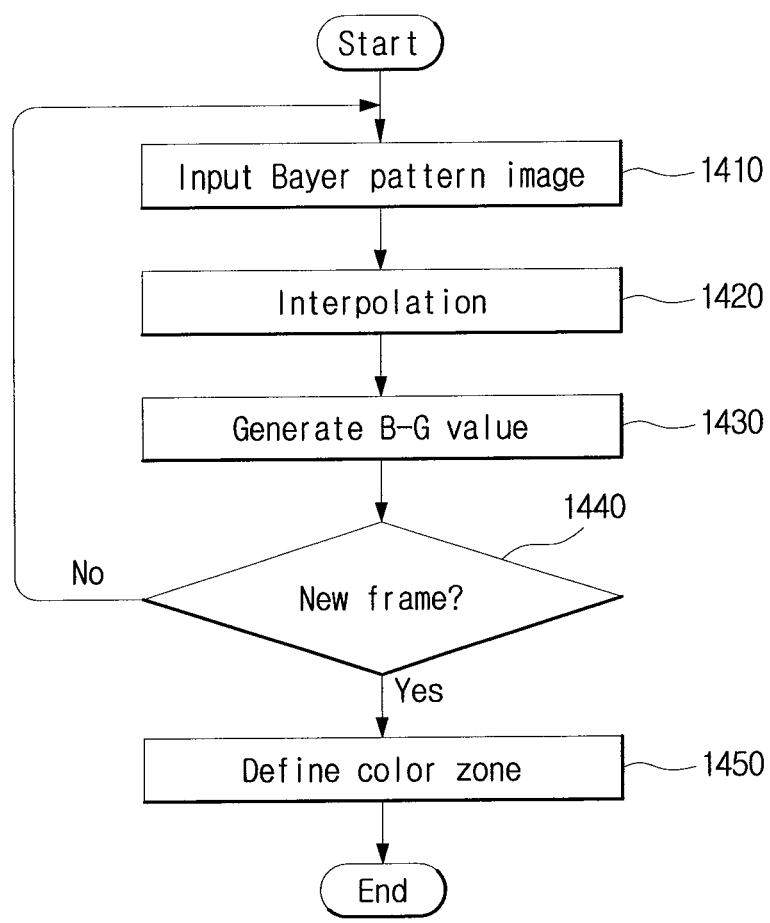
FIG. 14 shows a flowchart of a method for determining the color zone in accordance with a preferred embodiment of the present invention.

FIG. 14 is a flowchart showing a method for determining the color zone in accordance with a preferred embodiment of the present invention.

In describing the method for detecting color temperature with reference to FIG. 14, in accordance with the present invention, each step can be individually processed in the interpolation processing unit 530, the conversion unit 535, the mapping unit 540, and the color temperature detecting unit 545, respectively, but all steps will be treated as being processed in the image processing unit 515, for the convenience of description. The method for determining the color zone, described below, can be a process performed when the user selects a mode for determining a color zone through a user interface screen.

Referring to FIG. 14, the image processing unit 515 receives, in step 1410, a Bayer pattern image corresponding to an achromatic subject from the image sensor 510. The Bayer pattern image can be image information on an achromatic subject (e.g. white paper) photographed by the user for color correction of a light source. The Bayer pattern image is inputted sequentially in units of pixel.

Since each pixel in the Bayer arrangement image has one color data only, the image processing unit 515 performs interpolation, in step 1420, such that the pixel can have RGB color information.

In step 1430, the image processing unit 515 generates B-G color difference information using the interpolated G color information and B color information.

In step 1440, the image processing unit 515 determines if all of the B-G color difference information for all pixels of the pertinent frame (or all of the needed pixels for the determination of color zone) have been generated.

If all for the B-G color difference for all pixels have been generated, two reference points 610a and 610b (see FIG. 6) on the (B-G) axis are determined, in step 1450, in order to define the color zone. Once two reference points are determined, the color zone (i.e. filtering zone) is determined using each reference point and the characteristic curve corresponding to the image sensor 510. The method for defining a color zone has been described above, and thus will not be described herein.

In the method for defining the color zone, described above with reference to FIG. 14, the reference point is determined by an automated process. However, as described earlier, it is evident that a coordinate value chosen by the user or set by default can be determined for the two reference points on the (B-G) axis.

Figure 15:
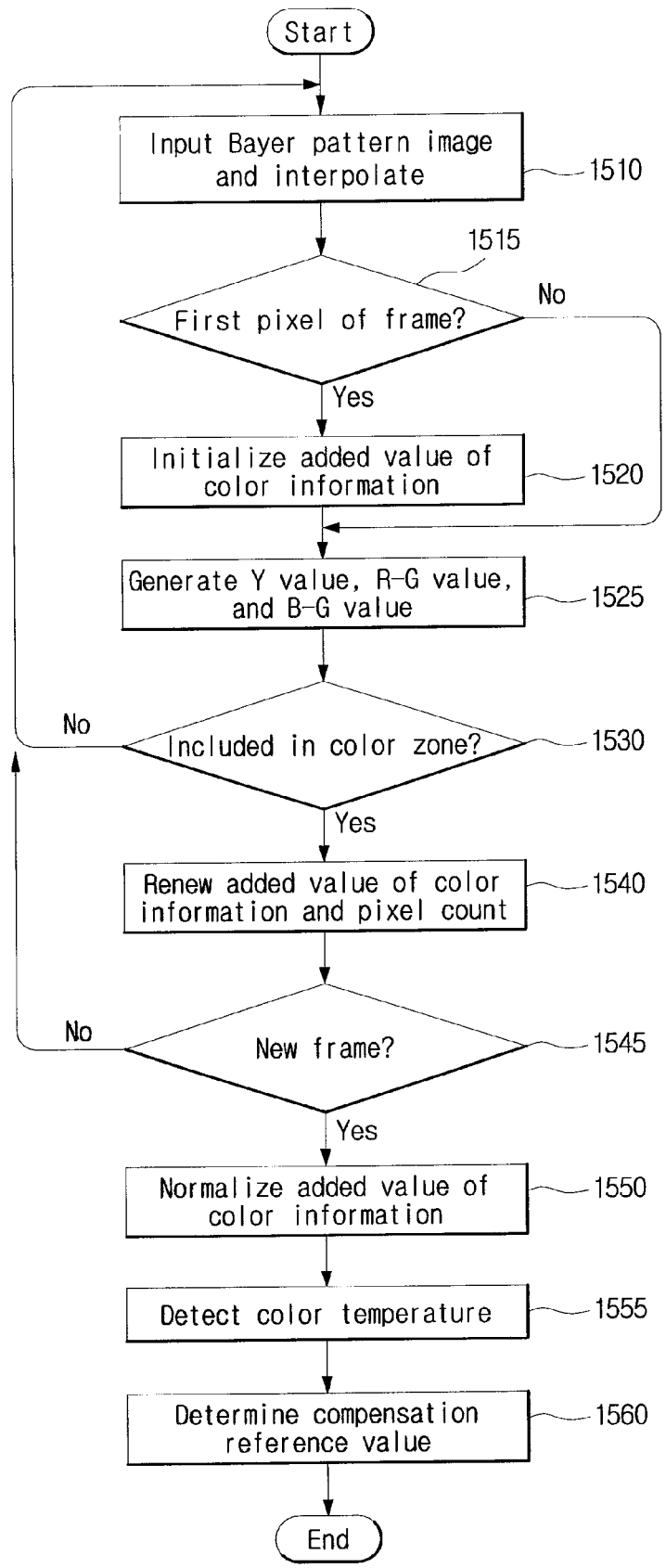
FIG. 15 shows a flowchart of a process for detecting color temperature in accordance with a preferred embodiment of the present invention.

FIG. 15 is a flowchart showing a process for detecting color temperature in accordance with a preferred embodiment of the present invention.

In describing the method for detecting color temperature with reference to FIG. 15, in accordance with the present invention, each step can be individually processed in the interpolation processing unit 530, the conversion unit 530, the mapping unit 540, and the color temperature detecting unit 545, respectively, but all steps will be treated as being processed in the image processing unit 515, for the convenience of description. Moreover, it will be assumed that the color zone has been defined by the color zone generating unit 537.

Referring to FIG. 15, in step 1510, the image processing unit 515 receives from the image sensor 510 a Bayer pattern image corresponding to an achromatic (e.g. white, gray, and black) subject, and performs interpolation. The Bayer pattern image can be image information on an achromatic subject (e.g. white paper) photographed by the user for color correction of a light source. The Bayer pattern image is inputted sequentially in units of pixel.

In step 1515, the image processing unit 515 determines if the pixel currently inputted is the first pixel of a particular frame.

In case of the first pixel, the image processing unit 515 initializes the added value of the color information on each of the R color information, G color information, and B color information (that is, initializes the register storing the added value to zero), in step 1520.

In step 1525, the image processing unit 515 generates a Y value, which is the luminance information, R-G color difference information, and B-G color difference information, using the interpolated R color information, G color information, and B color information. This is to convert the inputted information to values of the Y, R-G, and B-G color spaces, since the inputted information is a value of the RGB color space.

In step 1530, the image processing unit 515 determines whether the location of the three-dimensional coordinate consisting of converted values (i.e. Y value, R-G color difference information, and B-G color difference information) corresponding to the color information of the currently inputted pixel is included in the color zone (i.e. filtering zone—see FIG. 12).

If the location is not included in the color zone, step 1510 is repeated to process a following pixel that is inputted. If the location is included in the color zone, however, step 1540 is performed to accumulate each of the R color information, G color information, and B color information and renew the added value (i.e. $\Sigma$ (R color information), $\Sigma$ (G color information), $\Sigma$ (B color information)), and the pixel count is increased by 1. The pixel count is increased because the average of added color information needs to be obtained.

In step 1545, the image processing unit 515 determines whether the determination of inclusion of all pixels of the corresponding frame in the color zone using the color information has been completed.

If the determination has been completed, the image processing unit 515 normalizes the added values of color information, in step 1550. In other words, the added values of color information are divided by the pixel count to derive the average value.

In step 1555, the image processing unit 515 detects the color temperature by determining the color in the RGB color space, using the normalized added values of color information.

Then, the image processing unit 515 determines the compensation rate information, using the detected color temperature. The compensation rate information is a value for compensating color information such that the R color information, G color information, and B color information are shown as the same value. For example, if it is assumed that the R color information is 80, the G color information 100, the B color information 120, and the reference color information is the G color information, the compensation rate information for the R color information is 1.25 (i.e. 100/80) while the compensation rate information for the B color information is 0.83 (i.e. 100/120).

By applying the determined compensation rate information to the color information of each pixel, the image processing unit 515 allows the color information, distorted by a light source, to be displayed as color information under a natural light. As described above, the operation of applying the compensation rate information to a photographed image of a subject inputted after the determination of the compensation rate information can be performed by either the color temperature detecting unit 545 or a component (e.g. a component included in the image processing unit 515, an image display processing unit disposed in the display unit 520, etc.) performing image processing for displaying an image, corresponding to the subject, on the display unit 520.

The drawings and detailed description are only an example of the present invention, serve only for describing the present invention, and by no means limit or restrict the spirit and scope of the present invention. Thus, any person of ordinary skill in the art shall understand that a large number of permutations and other equivalent embodiments are possible. The true scope of the present invention must be defined only by the spirit of the appended claims.

INDUSTRIAL APPLICABILITY

As described above, the method and apparatus for detecting color temperature in accordance with the present invention can render accurate colors by correcting distorted color information through detecting the color temperature of current light source.

The present invention can also reduce error rates and minimize the amount of calculation by minimizing the area of the color zone (the filtering zone for detecting valid color information only), in which valid color information for detecting color temperature is distributed.

Moreover, the present invention can increase the accuracy of detecting color temperature by having the color zone determined to best fit the characteristic curve of the image sensor.

Furthermore, the present invention can increase process efficiency by eliminating the calculation of negative numbers or decimal numbers when detecting color temperature using valid color information.

What is claimed is:

1. A digital processing apparatus for a mobile communication terminal, the digital processing apparatus comprising:

a plurality of supplemental control units having first and second supplementary control units, each of the first and second supplementary control units configured to perform a predetermined supplementary function, wherein the supplementary function includes at least one of the functions including a camera function and a multimedia data playback function of the mobile communication terminal, the each of the first and second supplementary control units further configured to determine whether the each of the first and second supplementary control units are in a non-operating state for performing the predetermined supplementary function;

a plurality of memory units including first and second supplementary memory units, each of the first and second supplementary memory units coupled to the first and second supplementary control units, respectively; and a main control unit coupled to the first and second supplementary control units, and configured to control the first and second supplementary control units, the main control unit coupled to the each of the first and second supplementary memory units through the first and second supplementary control units, wherein each of the plurality of supplementary control units has a permission structure for permitting one of the main control unit and the second supplementary control unit to directly access the second memory unit when an additional storage is needed by the one of the main control unit and the second supplementary control unit, when the additional storage is needed by the one of the main control unit and the second supplementary control unit and the first supplementary control unit does not occupy a bus that connects to the first supplementary memory unit due to the non-operating state of the first supplementary control unit, the first supplementary control unit uses a bypass logic to switch a route to directly couple the one of the main control unit and the second supplementary control unit with the first supplementary memory unit using the permission structure, and wherein the bypass logic changes the route based on an operating status of the plurality of supplemental control units, and is used to switch the route when the first supplementary control unit is not operating.

2. The digital processing apparatus of claim 1, wherein the first supplementary control unit is not occupying the bus, when the first supplementary control unit is switched to the non-operating state or when the first supplementary control unit is operating but not using the first supplementary memory unit.

3. The digital processing apparatus of claim 1, wherein the bypass logic is run immediately after the first supplementary control unit switches to the non-operating state, and the first supplementary control unit sends corresponding status information to the main control unit after the bypass logic is run.

4. The digital processing apparatus of claim 1, wherein the first supplementary control unit has the bypass logic for switching the route, the bypass logic is run by an instruction of the main control unit, and the main control unit detects that the first supplementary control unit has switched to the non-operating state.

5. The digital processing apparatus of claim 1, wherein when the additional storage is needed by the main control unit and the first supplementary control unit is not occupying the bus that connects to the first supplementary memory unit, the main control unit directly writes processed data or data to be processed in the first supplementary memory unit through the route.

6. The digital processing apparatus of claim 1, wherein the first supplementary control unit performs only a bridging role between one of the main control unit and the second supplementary control unit, and the first supplementary memory unit, and the first supplementary control unit does not perform writing operation for processed data or data to be processed in the first supplementary memory unit.

7. A method for allowing access to an individual memory in a digital processing apparatus, the digital processing apparatus having a plurality of control units including a main control unit and a supplementary control unit and a plurality of memories subordinately coupled to each of the plurality of control units, and for allowing a supplementary memory among the plurality of memories belonging to the supplementary control unit to be used by the main control unit, the method comprising:

determining, by the supplementary control unit, whether the supplementary control unit is in a non-operating state for performing a predetermined supplementary function, the supplementary control unit configured to perform the predetermined supplementary function;

determining, by the main control unit, whether the supplementary control unit occupies a bus that directly connects to the subordinately coupled supplementary memory;

if the main control unit determines that the supplementary control unit is not occupying the bus due to the non-operating state of the supplementary control unit, running, by the supplementary control unit, a bypass logic, and changing a route to directly couple the main control unit, which controls at least one other supplementary control unit among the plurality of control units, and the supplementary memory;

determining, by the main control unit, whether an additional usable memory space is needed; and if the main control unit determines that the additional usable memory space is needed, storing processed data or data to be processed in the supplementary memory coupled through the route, wherein the bypass logic changes the route based on an operating status of the supplementary control unit, and is used to change the route when the supplementary control unit is not operating.

8. The method of claim 7, wherein the main control unit determines that the supplementary control unit is not occupying the bus when the supplementary control unit is switched to the non-operating state or when the supplementary control unit is operating but not using the supplementary memory.

9. The method of claim 7, further comprising:
sending, by the supplementary control unit, corresponding status information to the main control unit after the bypass logic is run.

10. The method of claim 7, further comprising:
determining, by the supplementary control unit, whether the supplementary control unit occupies the bus by recognizing whether an instruction to run the bypass logic is received from the main control unit.

11. The method of claim 7, wherein the supplementary control unit includes a bypass logic execution unit, and if the bypass logic is run, the bypass logic execution unit controls an interface to the supplementary memory and changes a use of the supplementary memory in accordance with the operating state of the supplementary control unit.

12. The method of claim 7, wherein, the supplementary control unit performs only a bridging role between the main control unit and the supplementary memory, and the supplementary control unit does not perform writing operation for processed data or data to be processed in the supplementary memory.

13. A method for allowing access to an individual memory in a digital processing apparatus, the digital processing apparatus having a plurality of control units including a main control unit, a first supplementary control unit, and a second supplementary control unit, and a plurality of memories subordinately coupled to each of the plurality of control units, respectively, and for allowing a first supplementary memory among the plurality of memories belonging to the first supplementary control unit to be used by another control unit, the method comprising:

determining, by the first supplementary control unit, whether the first supplementary control unit is in a non-operating state for performing a predetermined supplementary function, the first supplementary control unit configured to perform the predetermined supplementary function;

determining, by the main control unit, whether the first supplementary control unit occupies a bus corresponding to the subordinately coupled first supplementary memory;

if the main control unit determines that the first supplementary control unit is not occupying the bus due to the non-operating state of the first supplementary control unit, running, by the first supplementary control unit, a bypass logic, and changing a route to directly couple the main control unit, which controls at least one other supplementary control unit among the plurality of control units, and the first supplementary memory;

determining, by the main control unit, whether an additional memory space is needed for the second supplementary control unit, the second supplementary control unit configured to perform a predetermined second supplementary function;

if the main control unit determines that the additional space is needed for the second supplementary control unit, requesting, to the main control unit by the second supplementary control unit, address information of the first supplementary memory belonging to the first supplementary control unit in the non-operating state;

receiving, by the second supplementary control unit from the main control unit, the address information corresponding to the first supplementary memory from the main control unit if the first supplementary control unit is not occupying the bus; and using, by the second supplementary control unit, the route in order to store processed data or data to be processed in the first supplementary memory corresponding to the address information, wherein the bypass logic changes the route based on an operating state of the first supplementary control unit, and is used to switch the route when the first supplementary control unit is in the non-operating state.

14. The method of claim 13, wherein the first supplementary control unit includes a first bypass logic execution unit and the second supplementary control unit includes a second bypass logic execution unit, and if the bypass logic is run, the first bypass logic execution unit controls an interface to the first supplementary memory and changes a use of the first supplementary memory in accordance with the non-operating state of the first supplementary control unit.

15. The method of claim 13, wherein, the first supplementary control unit performs only a bridging role between the second supplementary control unit and the first supplementary memory, and the first supplementary control unit does not perform writing operation for the processed data or the data to be processed in the first supplementary memory.

16. A digital processing apparatus, comprising:
at least one supplementary control unit including a particular supplementary control unit configured to perform a predetermined supplementary function, wherein the supplementary function includes at least one of the functions including a camera function and a multimedia data playback function of a mobile communication terminal, the particular supplementary control unit further configured to determine whether the particular supplementary control unit is in a non-operating state for performing the predetermined supplementary function;

at least one supplementary memory unit including a particular supplementary memory unit, each of at least one supplementary memory unit coupled to the each of the at least one supplementary control unit, the particular supplementary memory unit coupled to the particular supplementary control unit; and a main control unit coupled to the at least one supplementary control unit, and configured to control the at least one supplementary control unit, the main control unit being coupled to the at least one supplementary memory unit through the at least one supplementary control unit, wherein each of the at least one supplementary control unit has a permission structure for permitting a direct access to one of the at least one supplementary memory unit when an additional storage space is needed by other control units, and the particular supplementary control unit switches a route using a bypass logic to directly couple the main control unit with the particular supplementary memory unit when the particular supplementary control unit does not occupy a bus connecting to the particular supplementary memory due to the non-operating state of the particular supplementary control unit and the additional storage space is needed by the main control unit, wherein the bypass logic changes the route based on an operating state of the particular supplementary control unit, and is used to switch the route when the particular supplementary control unit is in the non-operating state.

17. The digital processing apparatus of claim 16, wherein each of the plurality of supplementary control units includes a bypass logic execution unit which controls an interface to the corresponding supplementary memory unit, and each of the plurality of supplementary control units runs the bypass logic to change a use of the corresponding supplementary memory unit in accordance with an operating state of the each of the plurality of supplementary control units.

18. The digital processing apparatus of claim 16, wherein the at least one supplementary control unit includes a bypass logic execution unit which controls an interface to the corresponding supplementary memory unit, and the particular supplementary control unit runs the bypass logic to change a use of the particular supplementary memory unit in accordance with the operating state of the particular supplementary control unit.

19. The digital processing apparatus of claim 16, wherein, the particular supplementary control unit performs only a bridging role between the main control unit and the particular supplementary memory unit, and the particular supplementary control unit does not perform writing operation for processed data or data to be processed in the particular supplementary memory unit.

* * * * *